United States Patent [19]

Gould et al.

[11] Patent Number: 4,577,128

[45] Date of Patent: Mar. 18, 1986

[54] INDUCTION MOTORS

[75] Inventors: Deryk S. M. Gould, Edinburgh; Michael T. Wright, Limekilns, both of Scotland

[73] Assignee: Northern Engineering Industries, plc, England

[21] Appl. No.: 689,449

[22] Filed: Jan. 7, 1985

Related U.S. Application Data

[63] Continuation of Ser. No. 543,781, Oct. 20, 1983, abandoned, which is a continuation of Ser. No. 325,600, Nov. 27, 1981, abandoned.

[30] Foreign Application Priority Data

Dec. 11, 1980 [GB] United Kingdom ............... 8039707

[51] Int. Cl.[4] ........................................... H02K 5/12
[52] U.S. Cl. ....................................... 310/87; 310/90; 310/211; 310/DIG. 6; 417/423 R
[58] Field of Search ................ 310/42, 201, 261, 262, 310/263, 264, 157, 211, 179, 87, 90, 105, 166, 88, DIG. 6; 417/366, 423 R

[56] References Cited

U.S. PATENT DOCUMENTS

| | | | |
|---|---|---|---|
| 1,777,320 | 10/1930 | McCollum | 310/211 |
| 1,870,056 | 8/1932 | Kropff | 310/262 |
| 1,950,197 | 3/1934 | Taylor | 310/211 |
| 2,556,435 | 6/1951 | Moehrl | 310/157 |
| 2,698,911 | 1/1955 | Schaefer | 310/87 |
| 3,136,905 | 6/1964 | Zapf | 310/87 |
| 3,539,849 | 11/1970 | Kampfen | 310/87 |
| 3,551,714 | 2/1970 | Boyd | 310/87 |
| 3,778,652 | 12/1973 | Endress | 310/211 |
| 3,996,486 | 12/1976 | Madsen | 310/262 |
| 4,425,087 | 1/1984 | Gould | 310/87 |

FOREIGN PATENT DOCUMENTS 1427818  3/1976  United Kingdom ............... 310/211

OTHER PUBLICATIONS

"Three Dimensional Theory of Eddy-Current Couplings with Cooper-Faced Loss Drums"; E. T. Davis et al.; IEEE vol. 124, No. 12; 1977.

Primary Examiner—R. Skudy

[57] ABSTRACT

An induction motor with an improved torque/slip characteristic has a solid rotor having longitudinal grooves running parallel to the axis of rotation which connect with circumferential grooves at each end of the rotor. The rotor is plated with copper so that the grooves are filled with copper. The rotor is then machined over the cylindrical outer surface to produce a solid, non-laminated rotor having high-conductivity paths in the longitudinal grooves connected by high-conductivity short-circuiting rings in the circumferential grooves.

In a modification the longitudinal grooves may be skewed. Other high conductivity material may replace copper, for example aluminium.

4 Claims, 14 Drawing Figures

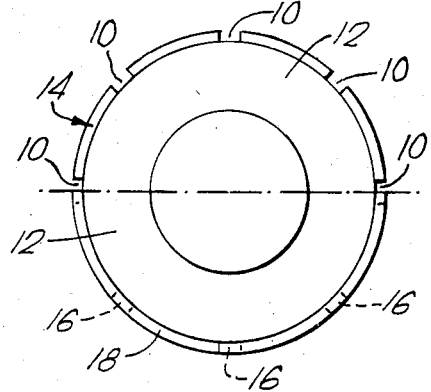
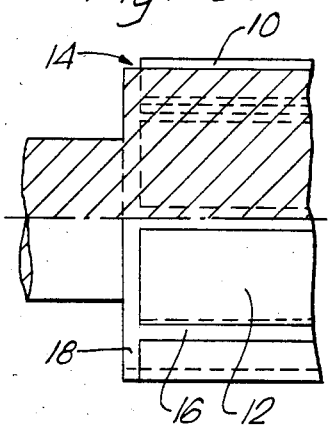
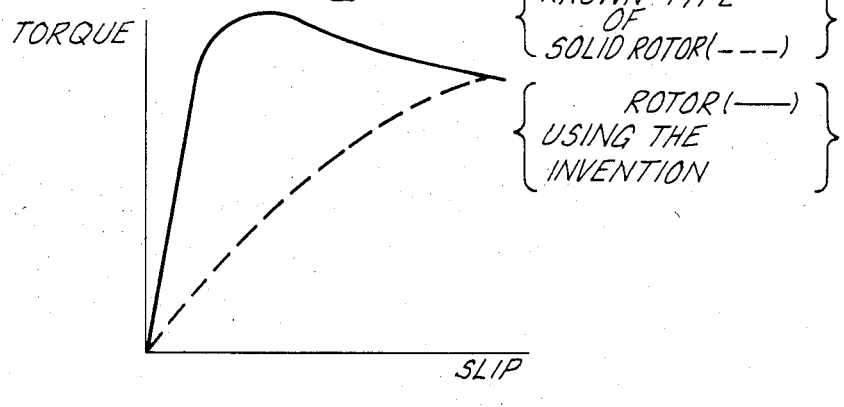
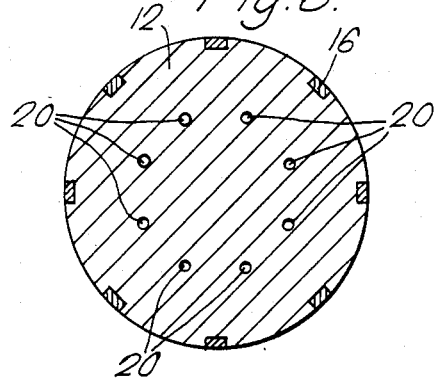

INDUCTION MOTORS

This is a continuation of application Ser. No. 543,781, filed Oct. 20, 1983, now abandoned, which is a continuation of application Ser. No. 325,600, filed Nov. 27, 1981, now abandoned.

CROSS-REFERENCE TO RELATED APPLICATIONS

The co-pending United States application Ser. No. 325,571, filed Nov. 27, 1981, now U.S. Pat. No. 4,425,087, entitled "Pressurising Apparatus" by D. S. M. Gould describes pressurising apparatus referred to herein.

BACKGROUND OF THE INVENTION

The invention relates to induction motors.

The rotors of known induction motors are required to have high permeability magnetic flux paths and high conductivity electric current paths. Accordingly it is usual to construct the rotor from thin steel laminations threaded with copper or aluminum bars. One important reason for laminating the rotor steel is to avoid the high frequency loss caused by pulsation of the air gap flux due to the stator slots.

A necessary design feature of laminated rotor induction motors is that the circular depth of the rotor laminations be of the same order as that of the stator (in order to carry the flux) (FIG. 1).

In certain special applications, where the overall machine diameter is limited, it is not possible to provide the necessary annular depth for the rotor laminations, while providing a shaft of sufficient cross-section for torque transmission, without a substantial derating of the power output of the machine.

Non-laminated rotors have been proposed for highly specialised relatively long machines of relatively small tranverse diamensions. Such machines are in a class of low power machines. The rotor then comprises a homogeneous steel cylinder, or tube, and the rotor material is chosen for its ability to carry magnetic flux and electric current and to transmit torque.

The material usually chose is a low carbon steel which often gives an acceptable compromise of magnetic and electric properties (FIG. 2). However, known motors having solid steel rotors suffer from two major disadvantages: high slip speed (and hence low efficiency) and poor power factor.

To reduce slip speed the rotor surface of known motors is sometimes covered with a high conductivity sleeve of copper. In such motors the steel carries the flux and the copper carries most of the current. However a major limitation to this type of rotor is the presence of high frequency rotor losses which can only be avoided by restrictive stator design. Also, because the high conductivity sleeve is in the airgap of the machine, the magnetic airgap ("entrefer") is increased over that for a homogenous rotor and the power factor is considerably worsened (FIG. 3). Such rotors are therefore proposed only in small induction motors of low output power on in current-driven machines, such as eddy-current couplings.

The present invention has the following objectives for an electric motor such as a submersible induction motor driving a pump, for example:

(1) most robust construction possible
(2) high ratio of starting torque/starting current
(3) minimum axial length (to minimise flexible shaft problems)
(4) best efficiency and power factor compatible with (1), (2) and (3).

Most known submersible pump motors have outside casing diameters in the range 100 to 350 mm. (3.94 inches to 13.78 inches). Axial lengths range from a few meters to 25 m. (984 inches).

Conventional known rotor constructions, involving laminations built up on a shaft, suffer from disadvantages in respect of the objectives:

(a) the laminations do not contribute to the strength of the rotor: this is provided by the shaft;

(b) starting torque/starting current ratios are of the order of 0.5:1 to 0.3:1 due to the natural characteristics of a laminated cage rotor. Increasing the rotor resistance to improve this ratio causes a reduction in full load efficiency and the need to dissipate excess heat from the rotor; (c) because of (a), the laminations do not contribute to shaft rigidity. The shaft diameter must therefore be chosen to ensure an acceptable maximum bending deflection under excited conditions. This means that the radial depth available for the passage of rotor flux is severely limited. (This effect is compounded if there is an additional requirement for the shaft to be hollow). Consequently, in machines of same diameter, the ratio radial depth becomes the limiting factor in achieving an adequate flux/pole and hence limits output per unit axial length.

The present invention combines three aspects of construction: to a solid ferromagnetic rotor; a conducting material; and disposition of conducting material in grooves. These aspects are discussed separately below:

A. Solid Ferromagnetic Rotor

The flux-carrying sections and stress-carrying sections in a non-laminted rotor are not distinct and separate but are common and the rotor throughout its full diametral dimension contributes a rigidity and is available for carrying flux. For a given saturation flux density the flux-per-pole, mean air-gap flux-density, and, hence, torque-per-unit-axial-length is relatively increased. The air-gap flux-density is relatively increased some 20 to 35%, depending on gap/diameter.

Because of the inherent high resistance of homogeneous ferromagnetic material excited with alternating current, an excellent starting torque/starting current ratio can be achieved (typical values in the range 1:1 to 0.7:1).

However a relatively high slip of around 6% is required to produce full load torque under full speed running conditions which causes inefficiency and rotor heating.

The solid ferromagnetic rotor provides rigidity, robustness and a good starting torque/current characteristic but at the low slip end of the torque/speed curve the curve is the wrong shape.

B. Conducting material

The shape of the torque/speed curve of a solid rotor machine is dictated by a dimensionless parameter, the so-called Gamma factor ($\Gamma$), derived in the analysis by Davis et al. (See Proceedings of the Institution of Electrical and Electronic Engineers Volume 124, No. 12, page 1187–1196, 1977). Page 1190 of that paper gives generalised torque/speed curves for solid-rotor, eddy-current couplings and illustrates that a homogeneous ferromagnetic rotor has a $\Gamma$ factor in excess of 2 for most of the torque/speed curve. An ideal $\Gamma$ factor which provides good starting characteristics is in the range 0.1 to 0.3, depending on specific requirements. The paper describes how a copper faced rotor can be used to achieve these values.

C. Conducting material in grooves

The techniques described in that paper give excellent results in couplings but induction motors in the size range applicable to pump drives for oil-wells, for example, very significant high-frequency losses are caused by negative-sequence fields arising from the interaction of the main air-gap field and the stator slotting pattern at normal running speeds.

In a motor according to the invention these losses are minimised and, at the same time, a $\Gamma$ factor of 0.1 to 0.3 is achieved. The conducting material is disposed in axial grooves. The number of grooves can thus be chosen to give the minimum high-frequency loss compatible with the avoidance of parasitic reluctance torques.

It should be noted that the invention is applicable also to inverted machines, in which the wound stator is mounted concentrically inside the rotor. In this case the plated grooves would be angularly spaced about the rotor within the bore of the rotor.

In this specification the term "unitary" means "non-laminated" and the term "plating" means electro-plating or spray plating or a process of deposition of material by which the deposited material is bonded to the substrate onto which it is deposited.

BRIEF SUMMARY OF THE INVENTION

An induction motor according to the invention comprises a stator and a rotor and the rotor is a unitary member of ferromagnetic material having first formations extending lengthwise of the rotor and angularly spaced about the rotor and first conductors located by said formations and extending lengthwise of the rotor, said conductors being composed of conductive material applied to said member by plating, and said member and said conductors presenting to said stator surfaces forming part of a common cylindrical shape.

Preferably, the rotor has second formations extending around the ferromagnetic member and first formations extending lengthwise of the rotor between the second formations and angularly spaced about the rotor, the rotor having ring or second conductors located by the second formations and extending about the rotor and the rotor having first conductors contiguous with the ring conductors and located by the first formations and extending lengthwise of the rotor.

Motors having the improved rotor are described herein by way of example to illustrate the invention with reference to the accompanying drawings in which:

BRIEF DESCRIPTION OF THE DRAWINGS

FIG. 4A is a diagrammatic end view of an improved rotor embodying the invention, the upper half showing the rotor before the application of copper by plating, the lower half showing the finished rotor;

FIG. 4B is a diagrammatic side view of the rotor shown in FIG. 4A, the upper half corresponding to the upper half of FIG. 4A and the lower half corresponding to the lower half of FIG. 4A but also being shown partly in vertical section;

FIG. 5 is a graph illustrating characteristics of a known motor and of a motor embodying the invention;

FIG. 6 is a diagrammatic end view of a modified rotor embodying the invention;

DETAILED DESCRIPTION OF THE PREFERRED EMBODIMENTS

Figure 1:
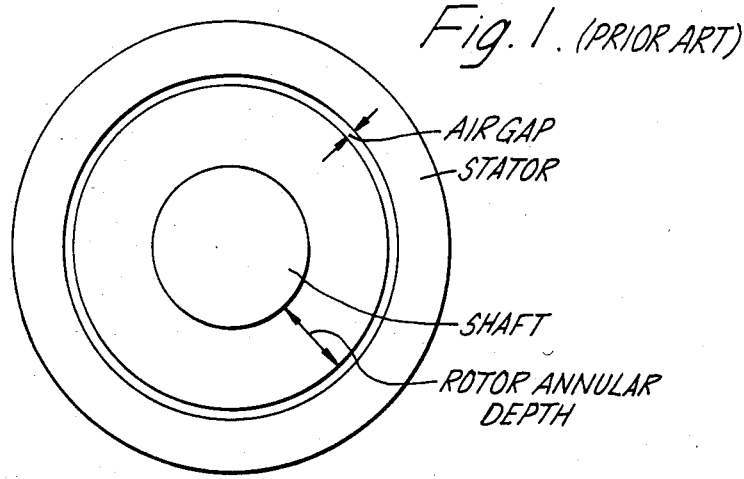
FIG. 1 is a diagrammatic end view of a known type of motor showing a known rotor in a known stator.
Figure 2:
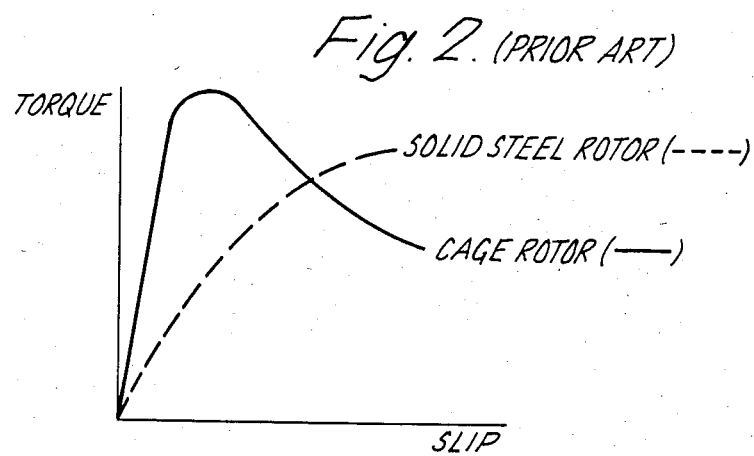
FIGS. 2 and 3 are graphs illustrating characteristics of known motors having known rotors.
Figure 3:
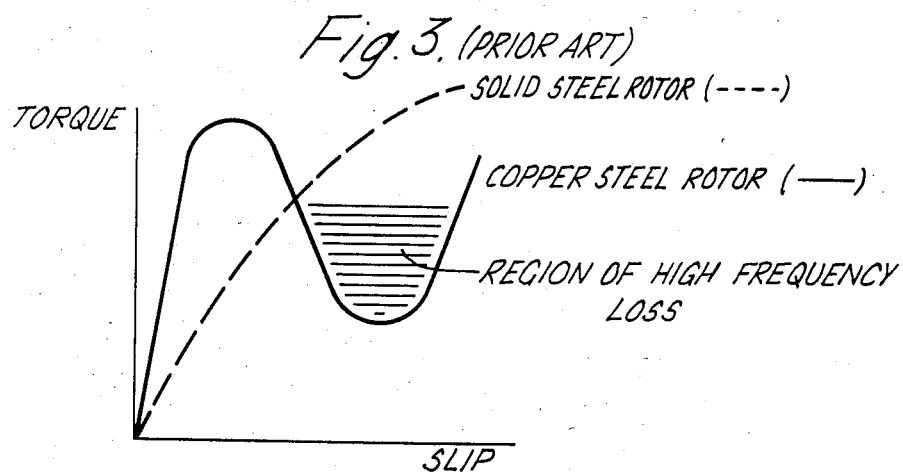

The rotor shown in FIGS. 4A and 4B consists of a solid cylindrical member 12 of steel, for example a low-carbon steel (or other ferromagnetic material) which is machined (or forged or cast) to an overall size slightly greater than the final reference size referred to below.

As shown on the upper halves of FIGS. 4A and 4B, rotor member 12 has eight equiangularly spaced straight grooves 10 extending parallel to the rotational axis of the member 12. Each groove is machined in the member 12 and is of rectangular cross-section. Typically the radial depth of such grooves 10 lies in the range 3 mm to 15 mm (0.12 to 0.60 inch), for example. Deeper grooves may be used for certain applications.

At each end, the member 12 is machined to provide an annular spigot relief 14, the radial depth of which equals the radial depth of the grooves 10 and the width of which equals the width of the grooves. (FIGS. 4A and 4B, upper halves).

After the grooves 10 and spigot reliefs 14 have been machined, the member 12 is prepared for overall electroplating with high conductivity copper. The preparation follows known practice in electroplating technology to ensure very good bonding between the plated copper and the steel and includes sandblasting; polishing; pickling if necessary; washing in solvent such as trichlorethylene, for example; cleaning in an electrolytic cleaner; and final rinsing and drying.

The member 12 is then immersed in an electro-plating bath using a suitable cyanide copper solution and electrical conditions are arranged to deposit high conductivity copper on the member 12 overall. Sufficient copper is applied to ensure that the grooves and reliefs are completely filled with copper. This requires that the thickness of copper in the grooves 10 and spigot reliefs 14 is not less than the original depth of those formations and in the spigot reliefs, not less than the original width.

The plated member 12 is then machined over the outer surface and the ends of remove surplus copper and a very small amount of steel to bring the finished surfaces to reference dimensions. The resulting rotor (FIGS. 4A and 4B lower halves) has external, longitudinally-extending, copper conductors 16, which are located in, and bound to the surfaces of, the grooves 10 and has copper end-rings 18, which are located in and bound to the surfaces of, the spigot reliefs 14.

The conductors 16 interconnect the end-rings 18 and the radially outer surfaces of the conductors 16 and the end-rings 18 are flush with the cylindrical surface of the steel member 12. The end surfaces of the end-rings 18 are flush with the steel end surfaces of the member 12. The end rings 18 and conductors 16 and the steel member 12 present to the stator surfaces which are parts of a common external cylindrical shape of the rotor 12.

The improvement in torque-slip performance provided by the new design of rotor is shown in FIG. 5.

In a modification (not shown) the grooves may be skewed with respect to the rotational axis instead of being parallel to the rotational axis.

In a modification (FIG. 6) the rotor may have cooling holes 20, shown in transverse cross-section through the rotor.

Such a motor is of particular advantage where the power output is required to be relatively high and the motor dimensions include relatively great length and relatively small diameter. For example, a motor for use in driving a down-hole pump for use in a drilled borehole of an oil-well may be 1400 millimeters (mm) (55 inches) long and some 200 mm (7.9 inches) in diameter, The rotor in such a machine would be some 1400 mm (55 inches) long and slightly less than 100 mm (3.9 inches) in diameter. Such a motor embodying the invention can be rated at 75 kilowatts (kW), equivalent to 50 kW per meter length of the machine. An example of such a motor is described below with reference to FIGS. 7 to 12.

The invention is also applicable to other types of induction motor having unitary rotors.

The following modifications may be adopted:

Instead of electroplating the conductive material may be applied to the rotor by spray-plating.

Instead of copper, alloys of copper or aluminum may be used as the high-conductivity material applied to the rotor.

Instead of spigot reliefs, the end-rings 18 may be formed in circumferential grooves in the member 12 adjacent its ends, for example as described below in relation to FIGS. 7 to 12.

Instead of rectangular-section slots, trapezoidal, part-circular or other cross-sectional shapes may be used. A trapezoidal section, for example, can be machined as an undercut groove to provide a dovetail shape which mechanically interlocks the finished conductor of copper (or other material) to the member 12. Similar undercutting and interlocking can be provided at the end grooves or spigot reliefs to secure the end-rings 18.

After the plated rotor has been machined as described above, a very thin layer of material such as nickel, molybdenum, zinc or chromium or material containing such elements may be applied by electro-plating or spray-plating. Such material is chosen to give protection against corrosion and erosion and the layer would usually be less than 10 micrometers (394 micro-inch) thick.

The member 12 may be a hollow cylinder instead of solid, for example as described below.

A different number of grooves may be used.

The motor shown in FIGS. 7 to 12 consists of the following main parts: an outer stator 22; stator windings 24; an inner rotor 26; and the rotor conductive cage 28.

The stator 22 includes an outermost stator tube 30 and the motor is shown in the drawings positioned within a cylindrical lining of a borehole of an oil-well in strata 31, the lining being the so-called production tube 32. Of course, the orientation of the tube 32 and the rotational axis of the motor would in practice be vertical or inclined to the vertical rather than horizontal as shown in the drawings. The left-hand end of the motor as shown in the drawings would be the upper end in practice.

The stator includes two similar packs of annular steel laminations 34 mounted in the tube 30 between end rings 36. The end rings 36 (FIG. 9) each have 24 equiangularly spaced open-ended slots 38 in the inner face thereof. The stacks of laminations 34 (FIG. 10) each have corresponding inner close-ended slots 39. The two stacks are separated by an annular third intermediate bearing means 45 at the centre of the motor supporting the rotor 26. The bearing means 45 has corresponding closed-ended slots 41 and an innermost bearing ring 43 (FIGS. 11 and 12), which is a shrink fit in the bearing means 45.

The stacks of laminations 34 have three sets each of three outer grooves 40 to receive insulated bus bars 42, which extend right through the stator 22 and to which electrical connections such as 44 are made. Such connections 44 connect the stator windings 24 to switchgear (not shown) contained in a housing (not shown) connected to the remote end of a pressure equalising apparatus, which has a housing 46 secured to the stator tube 30. The pressure equalising apparatus is preferably of the kind described in the co-pending application of D. S. M. Gould Ser. No. 325,571.

Figure 7A:
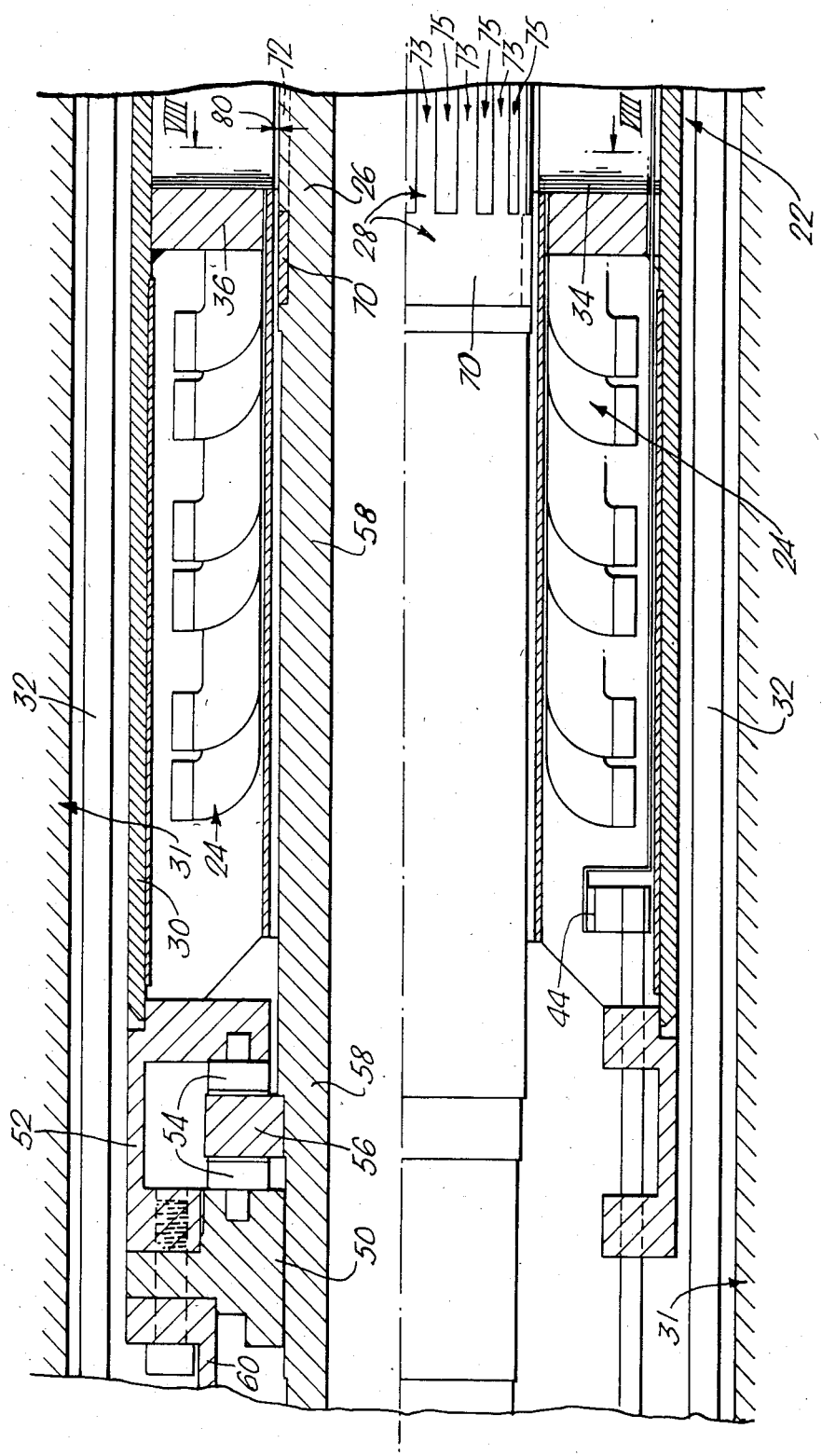
FIGS. 7A, 7B and 11 are diagrammatic longitudinal diametral sections through parts of downhole pumping equipment for use in an oil-well installation including, and primarily showing, the elctric pump motor thereof.
Figure 7B:
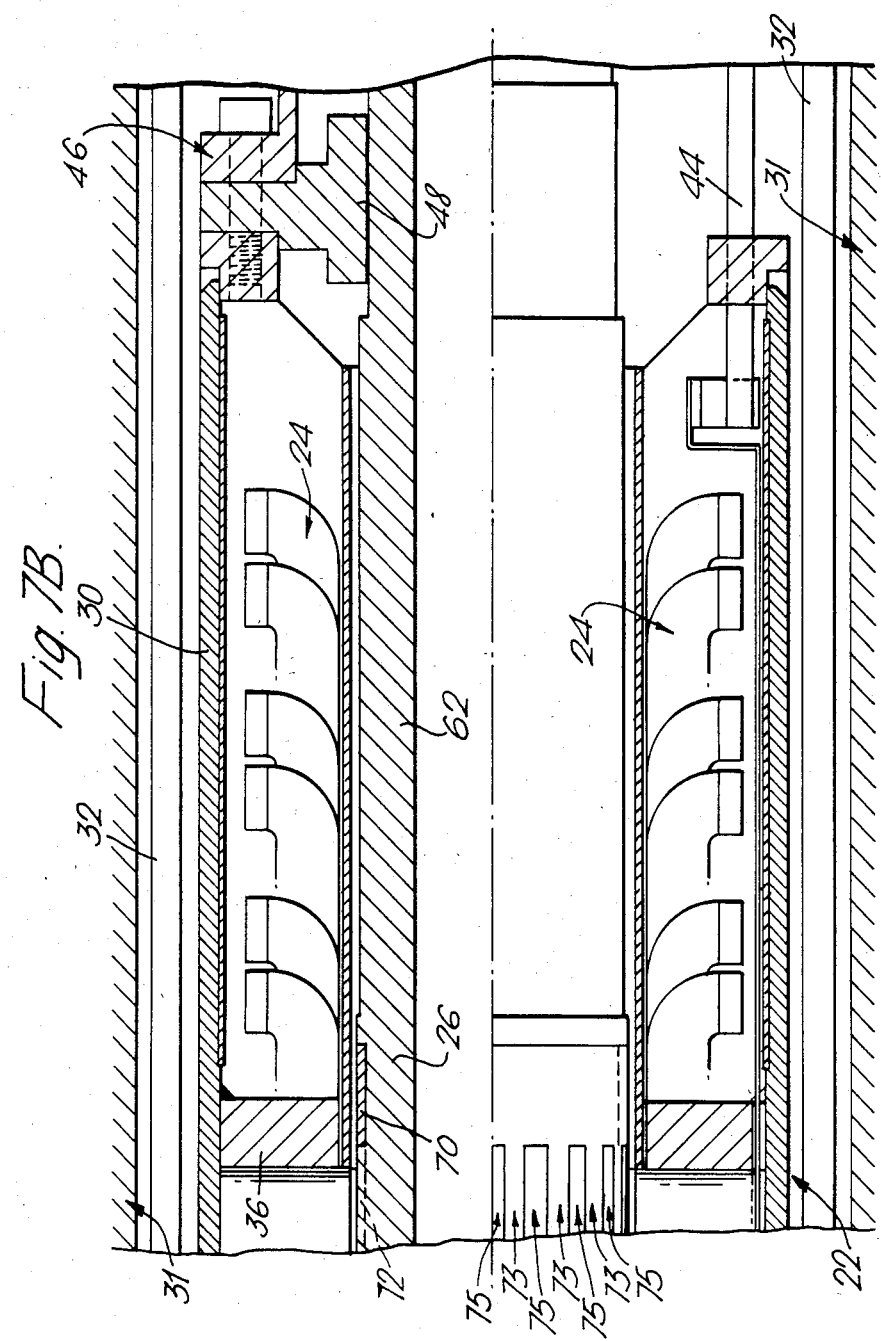
Figure 8:
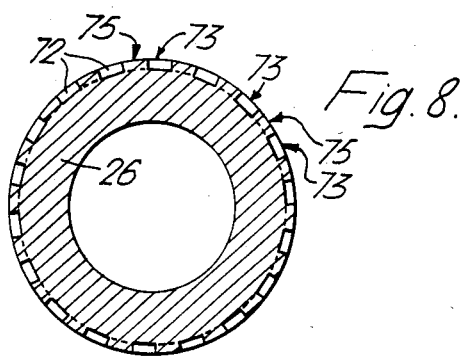
FIGS. 8, 10 and 12 are diagrammatic transverse sections on the lines VIII—VIII, X—X and X11—X11, respectively, in FIGS. 7A and 11.

An annular first bearing 48 is secured between the stator tube 30 and the housing 46 at the right-hand end (FIG. 7B). A similar second bearing 50 is provided at the left-hand end of the motor (FIG. 7A). The stator tube 30 is secured at that end to an annular connector piece 52 within which thrust bearing pads 54 are mounted which slidingly engage a thrust ring 56 mounted on a shaft extension 58 integral with the rotor 26.

The bearing 50 is secured between the piece 52 and a cylindrical extension 60, which carries a seal assembly (not shown) running against the shaft 58.

The rotor 26 as shown in a hollow cylindrical steel (for example, low-carbon steel) member having at the left-hand end the integral shaft extension 58 and a similar integral extension 62 at the right-hand end. The first and second bearings 48, 50 are engaged by the end shaft extensions 62, 68, respectively.

The rotor conductive cage 28 consists of two end-rings 70 each 30 millimeters (1.15 inch) wide and 3 mm (0.115 inch) radially deep in respective annular grooves in the rotor 26. The rings 70 are interconnected by eighteen equiangularly spaced straight conductors 72 making up the remainder of the cage 28. Each conductor 72 is 7.5 mm (0.29 inch) wide and 3 mm (0.115 inch) radially deep and is in a corresponding straight groove in the rotor 26.

The conductors 72 are circumferentially-spaced by an amount equal to their widths but other numbers, widths and spacings may be used.

The outer cylindrical surface 73 of the cage 28 is flush with the adjacent cylindrical steel surface 75 of the rotor 26 and the common diameter is 83 mm (3.26 inches). The length of the cage 28 is 1734 mm (68.26 inches).

The cage 28 is formed by electroplating copper onto the rotor 26 (which has already had the grooves machined in its surface) so as to fill the grooves completely. After plating the rotor 26 was machined to remove excess copper and a skim thickness of steel to bring the rotor outer diameter to the required finished dimension. The rotor surface was of course carefully prepared as explained above in relation to FIGS. 1 to 5 to ensure excellent bonding of the copper to the steel substrate surface beneath.

Figure 9:
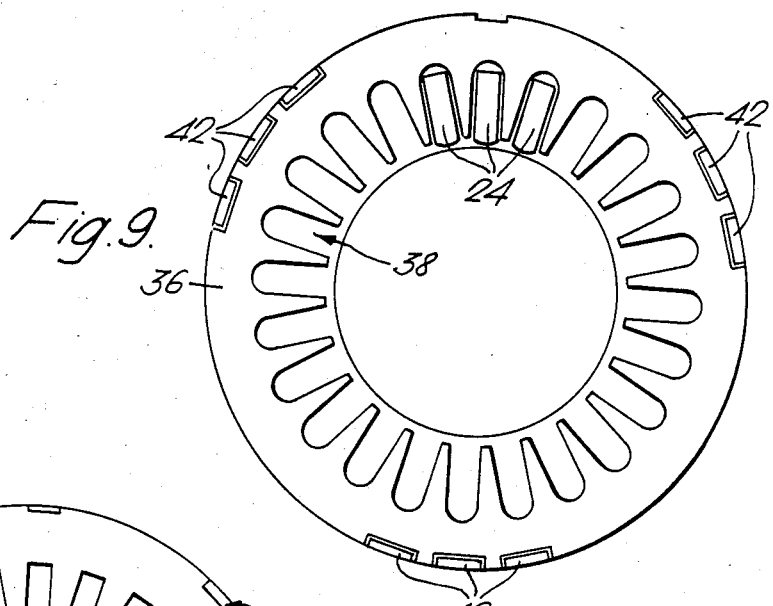
FIG. 9 is a diagrammatic end elevation with parts removed, of the motor shown in FIGS. 7A and 7B showing a stator end ring thereof.
Figure 10:
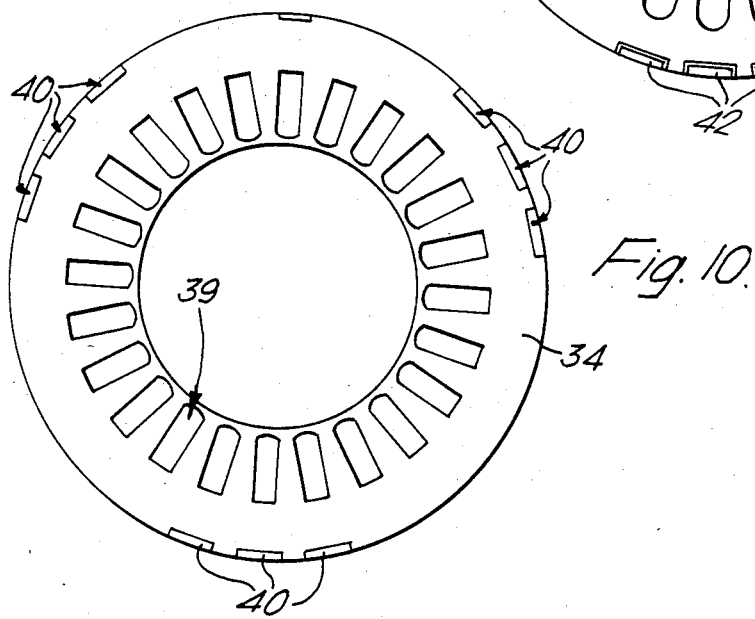
Figure 11:
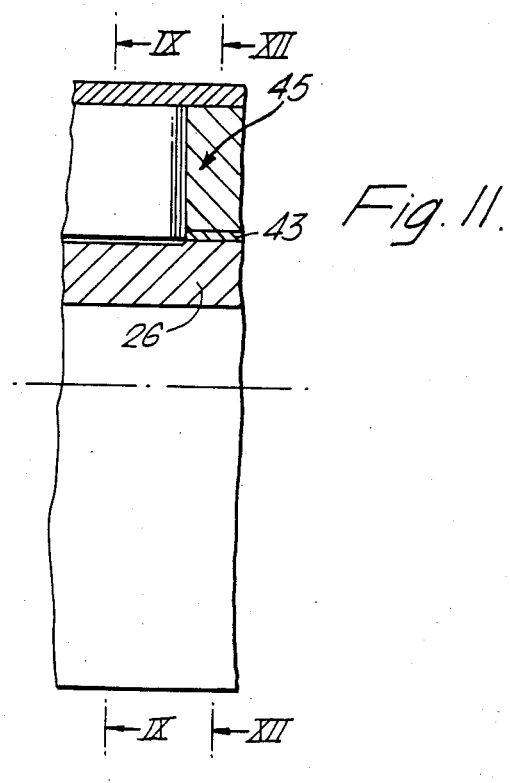
Figure 12:
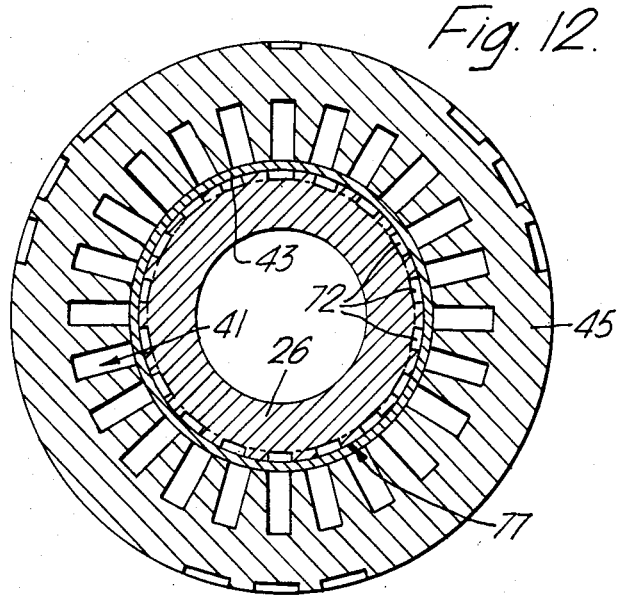

As previously described, the stator 22 is composed of two similar packs of laminations 34 mounted between end rings 36, and in the stator between the two packs is mounted the third intermediate bearing means 45 which comprises and supports on its interior the bearing ring 43 which, as depicted in FIG. 12, directly engages and rotatably supports the plated cylindrical steel surface of the rotor 26 in which is embedded the conductive cage 28 to form a common cylindrical bearing surface 77. Slots 41 are cut in the third bearing means 45, and align with the slots 38,39 in the stator end rings 36 and laminations for receiving the stator windings 24 (three of which only are shown in FIG. 9), whose ends are shown in FIGS. 7A and 7B.

The air-gap at 80 between the rotor 26 and the innermost surfaces of the stator laminations 34 is 1.5 mm (0.057 inch).

The motor proper has a length over the ends of the stator windings 24 measured to the ends of the stator tube 30 of approximately 2180 mm (85.32 inches). The outer diameter of the stator tube is 178 mm (7 inches).

The motor is typically rated for example at 85 kilowatts, 3,300 volts, 23 amperes for a 3-phase supply at 100 hertz.

The motor is filled with mineral oil under pressure before it is passed into the production tube 32. During installation the pressure is maintained above ambient. Upon first running up to speed the pressure is equalised to ambient. These functions are performed by the pressure equalising apparatus as explained in the co-pending application of D. S. M. Gould referred to above.

If preferred, the rotor just described may be given a protective finish, after it has been machined to size, by a second plating technique as already described above.

Although in the preferred constructions described above the rotor is plated and then machined to final size, it may be possible in some cases to dispense with machining. For example, by control of the plating step the external rotor surface after completion of plating may be made to be acceptable without the need for machining.

Although in the preferred embodiments of the invention described above by way of example the rotor has end-rings which short-circuit the lengthwise conductors, it may be possible to dispense with end-rings in some constructions. For example the rotor may have conductive members other than rings which short-circuit the lengthwise conductors or the lengthwise conductors may be interconnected electrically in some other way, for example, by conductors of copper or other material not applied to the rotor by plating. In all such modifications the rotor presents a cylindrical surface to the stator and the construction of the rotor is such as to give the motor the torque/slip characteristic described above, the lengthwise conductors in all cases being in the form of material applied by plating as described above.

What is claimed is:

1. A submersible oil well pump induction motor comprising:
    (a) an elongated hollow stator having windings;
    (b) an elongated unitary rotor extending through said stator, said rotor comprising:
    (b1) a hollow continuous tubular shaft of ferromagnetic material of substantially uniform diameter having first and second integral formations, said first formations extending lengthwise of said shaft and said second formations extending annularly of said shaft, and first and second conductors plated onto said shaft, said first conductors being elongated conductors located in said first formations and said second conductors being annular conductors located in said second formations and being in contact with said first conductors to short-circuit said first conductors,
    (b2) surface portions of said rotor and of said conductors together forming a contiguous cylindrical surface facing said stator,
    (b3) and a plated anti-corrosion layer applied over said contiguous cylindrical surface,
    (4) the length of said rotor substantially exceeding the diameter of said rotor;
    (c) first and second spaced-apart radial bearings mounted on the stator and rotatably supporting the rotor and journalled respectively on end extensions of said rotor;
    (d) and a third radial bearing intermediate said first and second radial bearing and mounted on the stator and directly journaled on said plated contiguous cylindrical surface at a location intermediate said first and second bearings thereby rotatably supporting an intermediate portion of said rotor.

2. A motor according to claim 1, wherein the ratio of the length of the rotor to the diameter of the rotor is greater than 5:1.

3. A motor according to claim 2, wherein the ratio of the length of the rotor to the diameter of the rotor is greater than 14:1, and the rated power of the motor is at least 75 kilowatts.

4. A motor according to claims 1, 2, or 3, wherein the radial depth of said first and second conductors is in the range of 3–15 millimeters.

* * * * *